May 27, 1969

L. G. DUBUIT 3,446,335

AUTOMATIC DEVICES FOR DISTRIBUTING AND DIRECTING VARIOUS
OBJECTS SUCH AS FLASKS, TUBES OR THE LIKE

Filed May 15, 1967

INVENTOR
LOUIS GILBERT DUBUIT

INVENTOR
LOUIS GILBERT DUBUIT

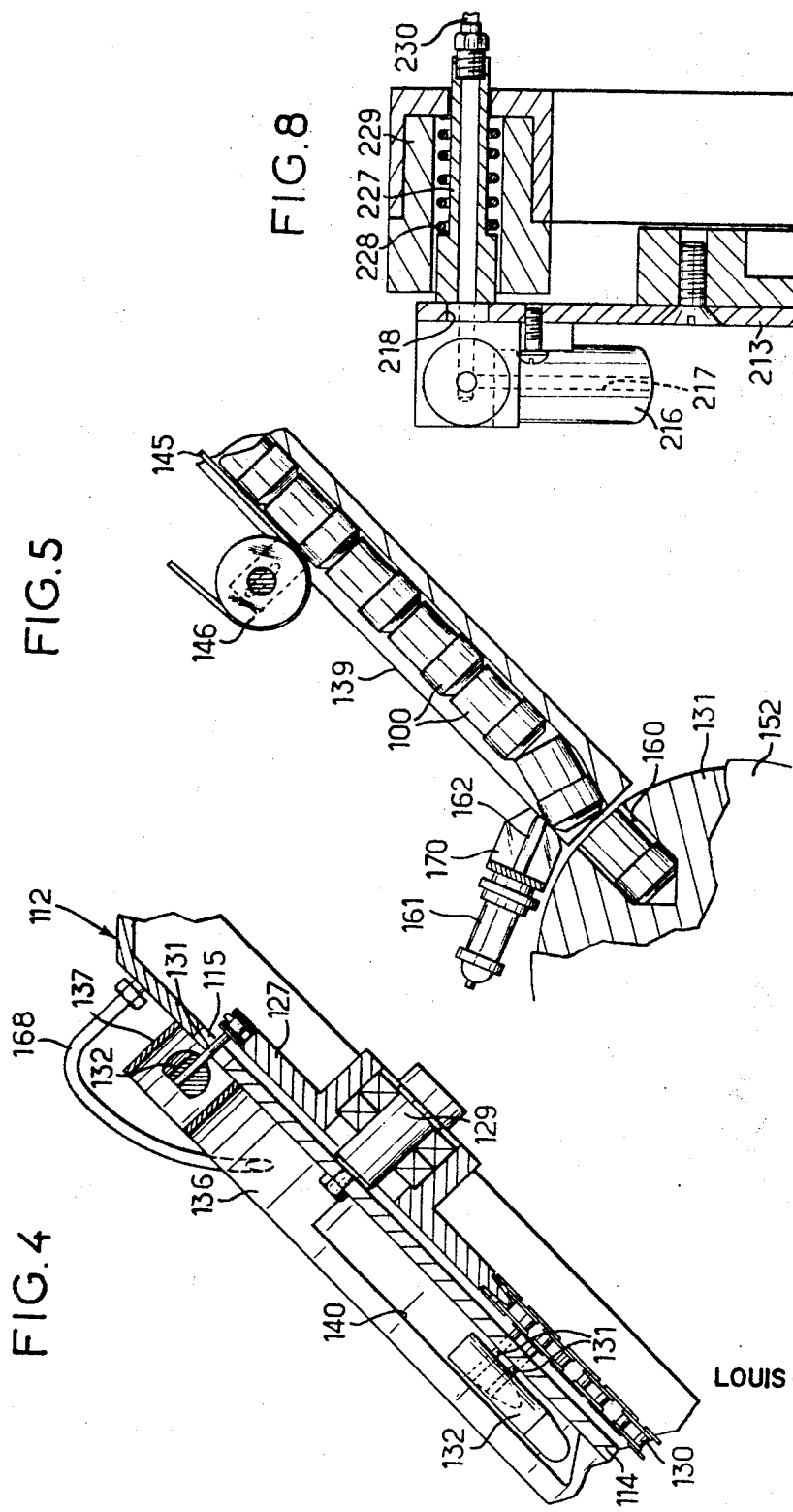

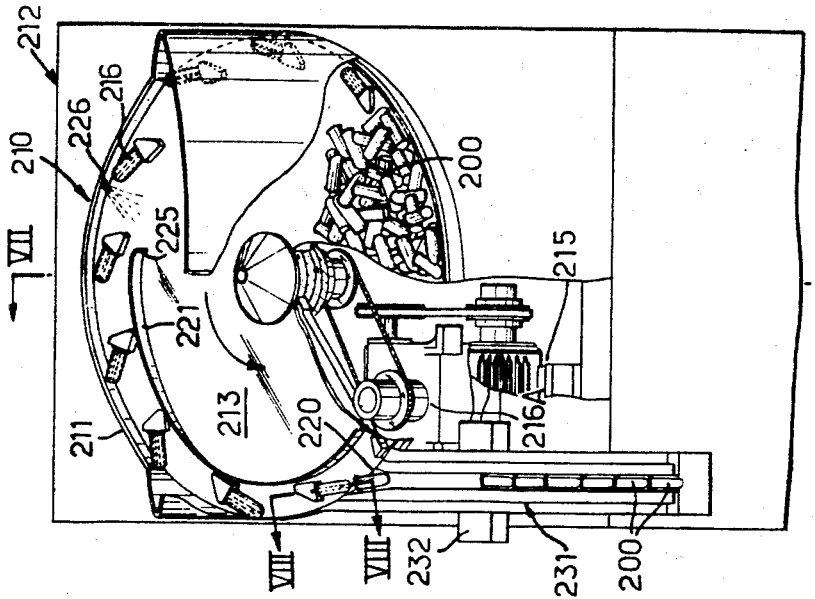
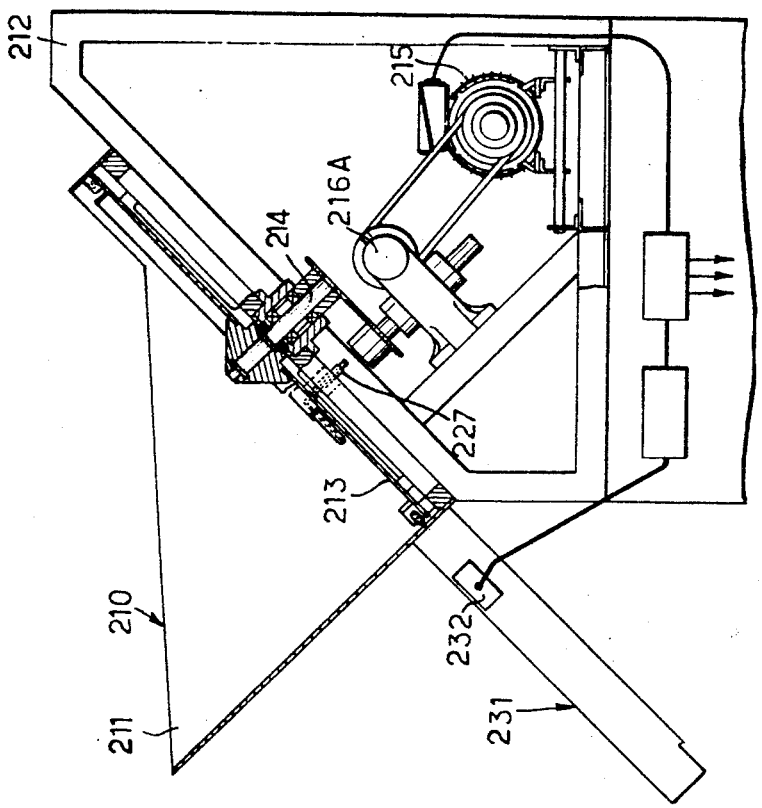
FIG.6
FIG.7
INVENTOR
LOUIS GILBERT DUBUIT

United States Patent Office 3,446,335
Patented May 27, 1969

3,446,335
AUTOMATIC DEVICES FOR DISTRIBUTING AND DIRECTING VARIOUS OBJECTS SUCH AS FLASKS, TUBES OR THE LIKE
Louis Gilbert Dubuit, 60 Rue Vitruve, Paris 20, France
Filed May 15, 1967, Ser. No. 638,210
Claims priority, application France, May 18, 1966, 62,014; Apr. 6, 1967, 101,687
Int. Cl. B65g 47/24
U.S. Cl. 198—33    11 Claims

ABSTRACT OF THE DISCLOSURE

The chamber into which the objects are emptied in loose bulk and from which they are extracted by transfer members is formed by a bottom wall and a cylindrical wall, separate from each other, at least one of these walls being fixed, which reduces the frictional rubbing to which the objects are subjected. A photoelectric detector mounted downstream of this chamber stops the transfer members in the case of an excessive flow rate, which regularises the rate of flow without the necessity of recycling objects delivered in excess quantities and therefore again reduces the handling of the objects.

---

The present invention relates to automatic devices for distributing and directing various objects such as flasks, bottles, tubes, stopper caps or the like, currently utilized for the automatic supply of objects, one at a time and following a predetermined longitudinal orientation, to a receiving line such as a printing line, a filling line, a stopper-insertion line or the like.

Devices of this type generally comprise a supply chamber receiving the receptacles to be distributed and orientated in loose bulk, means for taking the said objects from the said chamber, and evacuation means supplied with objects by the said taking or transfer means and transferring them to the receiving line.

In devices of this type known at the present time, the supply chamber is a tank formed by a bottom wall and a cylindrical wall coupled to each other and driven in rotation about its axis, the cylindrical wall of the said tank being provided with driving rods projecting from its inner face and forming the transfer means inclined to the direction of the generator lines of the said wall, in combination on the one hand with a spiral fixed ramp mounted in the vicinity of the transfer rods, and on the other hand with a scraping rake, scraping the bottom of the tank as the latter rotates, for the purpose of guiding the receptacles contained in this tank in the direction of the cylindrical wall of the said tank.

These tanks are relatively expensive to construct, and in addition it is not infrequent that a receptacle becomes accidentally jammed under the scraping rake.

Furthermore, in order to ensure correct feeding to the receiving line, it is the usual practice to give the automatic distribution and orientation device, mounted on the upstream side, an output greater than the output of the receiving line, the objects supplied in excess at the input of the line being eliminated and recycled in the direction of the supply chamber.

This recycling adversely affects the quality of the objects treated which, being continually churned about, lose their surface finish if they are bare, and have their decoration spoiled.

The present invention has for its object various improvements, especially enabling the drawbacks referred to above to be overcome.

In accordance with one of the improvements of the invention, the walls of the supply chamber are independent of each other and at least one of the said walls is fixed.

The construction of a supply chamber of this kind is particularly economical, since it does not necessitate the coupling of a transverse bottom wall to a cylindrical wall. In addition, since at least one of these walls is fixed, the objects treated are subjected to a smaller amount of friction and therefore of wear. Finally, as will be seen subsequently, the necessity of providing a scraping rake is eliminated.

According to a further improvement of the invention, on the evacuation means is provided a photoelectric cell, the control beam of which is interrupted by each of the objects carried by the said evacuation means as they pass by in line, the said cell operating the stoppage, when it is not excited, of the said transfer means, through the intermediary of a time-lag relay, the time delay of which is at least equal to the time of passage of an object in front of the cell, which permits a uniform feed, without choking, of the receiving line, and without recycling the excess objects, which improves the condition of these latter. In fact, the time-lag relay does not effect the stopping of the transfer means upon the passage of an isolated object, but operates it when an object is blocked in front of the cell. There are in fact therefore no excess objects but a stoppage of the distribution device.

The characteristic features and advantages of the invention will further be brought out in the description which follows below of various forms of embodiment, reference being made to the accompanying drawings, in which:

FIG. 4 is a view in cross-section to a larger scale of a detail of this latter alternative, taken along the line III—III of FIG. 2;

FIG. 5 is a view in cross-section to a different scale of a further detail of this alternative, taken along the line V—V of FIG. 2;

FIGS. 6 and 7 are views respectively similar to FIGS. 2 and 3, and relate to a further alternative form of construction;

FIG. 8 is a view in cross-section to a larger scale of this further alternative form, taken along the line VIII—VIII of FIG. 6.

Figure 1:
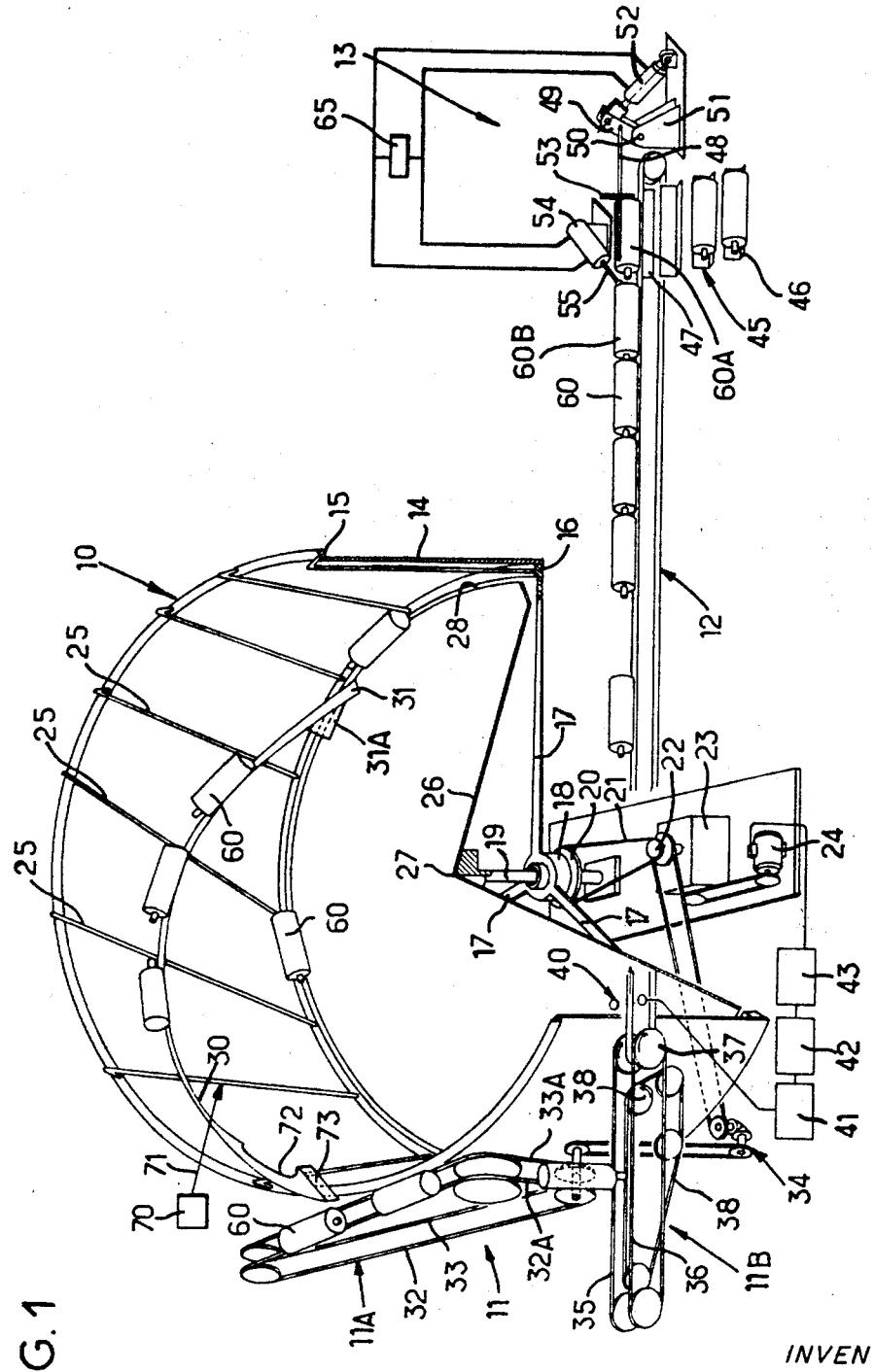
FIG. 1 is a perspective general view of a distribution and orientaion device according to the invention.
Figure 2:
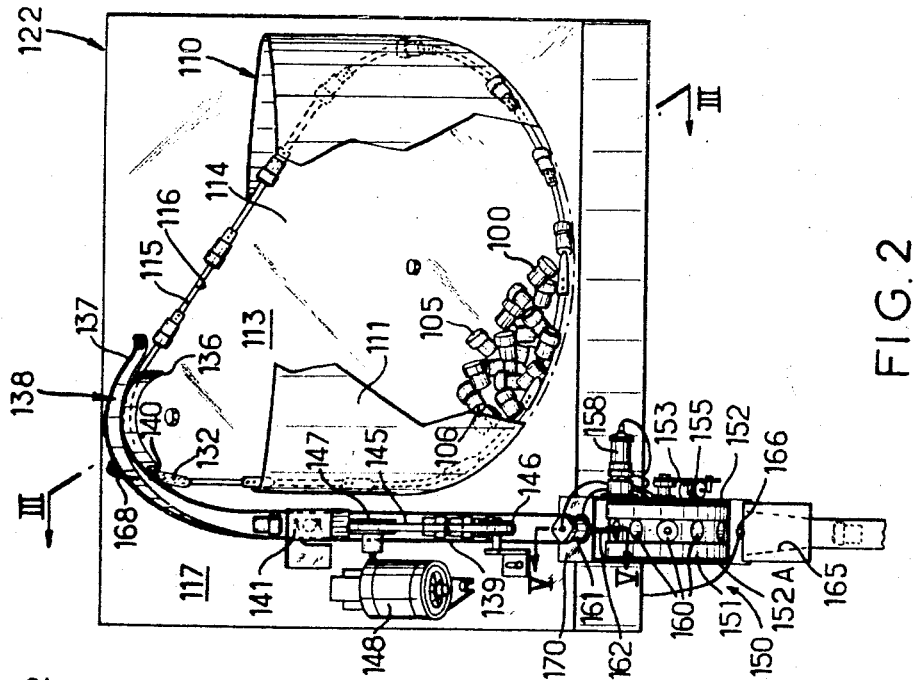
FIG. 2 is a view in elevation, with parts broken away, of an alternative form of embodiment of the distribution and orientation device according to the invention.
Figure 3:
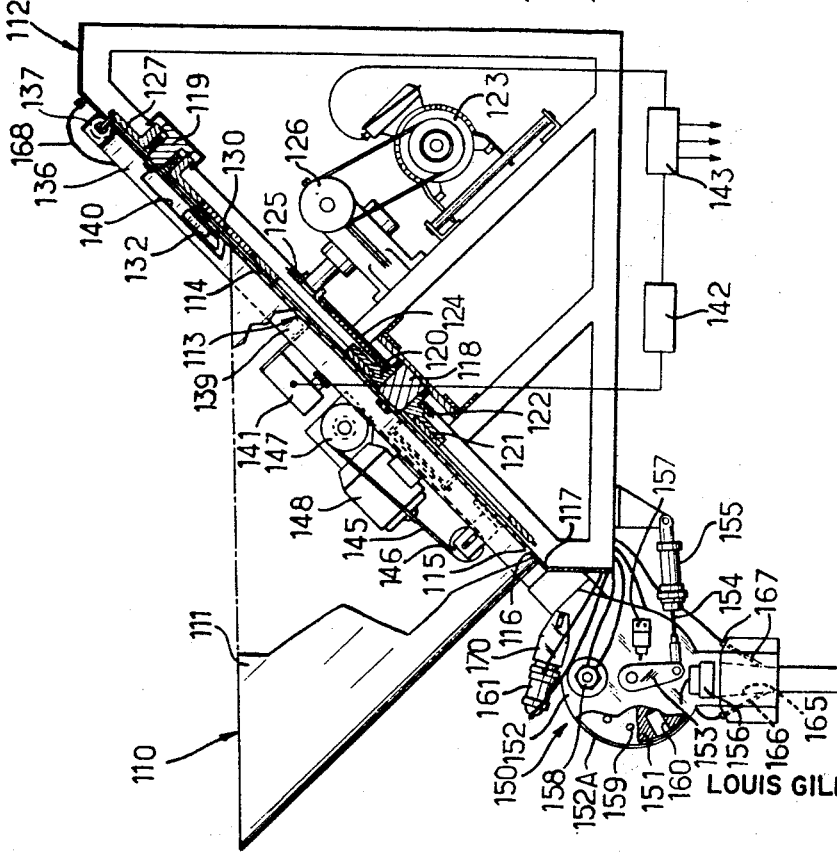
FIG. 3 is a view in vertical cross-section of this latter alternative, taken along the line III—III of FIG. 2.

According to the form of construction chosen and shown in FIG. 1, the automatic distribution and orientation device according to the invention comprises a supply chamber 10 and evacuation means comprising a driving and orientation unit 11, a conveyor belt 12 and a transfer device 13, and it is intended to deposit the receptacles 60 one by one on a receiving chain 45, of which only a few containers 46 have been shown diagrammatically.

The supply chamber 10 is provided with a cylindrical wall 14, of which the upper extremity, known as the outlet extremity, is bent back towards the exterior so as to form an edge 15, while the lower extremity is provided internally with a circular ring 16. This circular base ring 16 is fixed by arms 17 to a hub 18 rotatably mounted about a fixed shaft 19, under the control of a pulley 20 coupled by a belt 21 to the output shaft 22 of a reduction gear 23 driven by a motor 24.

In addition, the cylindrical wall 14 is provided internally with driving or transfer rods 25 projecting from the said wall and inclined to the direction of the generator lines of the wall, and fixed on the one hand to the base ring 16 and on the other hand to the upper edge 15.

The bottom of the supply chamber 10 is formed by a fixed conical wall 26 rigidly fixed on the fixed shaft 19 and arranged in such a manner that its apex 27 is directed towards the outlet extremity of the cylindrical wall 14, that is to say towards the upper edge 15 of this latter, and in such manner that its free circular edge 28 is tangential to the base ring 16 of the cylindrical wall 14.

The supply chamber 10 is also provided with a helicoidal transfer ramp 30, the lower extremity of which is fixed at 31 to the conical wall 26, while the upper extremity projects from the cylindrical wall 14 and is slightly twisted in the direction of the driving assembly 11.

This helicoidal ramp 30 is formed by a metal strip held in position, on the one hand at 31, where it is welded to the fixed cone 26 by a gusset 31A, and on the other hand at 73 to the fixed frame of the machine (not shown); it is arranged in the vicinity of the transfer rods 25 and substantially at right angles to these rods.

The driving assembly 11 comprises, in known manner, a first set 11A of conveyor belts 32 and 33, having a practically vertical section, 32A, 33A respectively vertically above a second set of conveyor belts 11B.

The set 11A of conveyor belts 32, 33 is actuated in rotation by the speed-reduction gear 23, through the intermediary of an assembly 34 of return belts and pulleys.

The set 11B of conveyor belts comprises, in a manner known per se, two parallel conveyor belts 35 and 36 driven in rotation in the direction of the arrow 37, and an intermediate belt 38 arranged in the centre of the belts 35 and 36 and driven in rotation in the direction of the arrow 38, that is to say in the opposite direction to the driving direction of the belts 35 and 36.

As this device is known per se, its control has not been shown in detail on the drawing.

At their downstream extremities, the conveyor belts 35 and 36 enclose the forward-moving conveyor 12, which is slightly inclined towards the front and travels between two vertical walls (not shown), so as to keep the bottles on the axis of this conveyor as they are carried along by it.

At the upstream extremity of the forward conveyor 12, there is arranged a photoelectric cell 40 shown diagrammatically in the drawings. Through the successive intermediary of an amplifier 41 and a time-lag relay 42, this cell operates a contact switch 43 inserted in the electric supply line of the motor 24.

The transfer device 13 is mounted directly above the receiving line 45. This transfer device comprises an inclined plane 47 which is flush with the level of the forward conveyor 12; a longitudinal abutment 48 formed by a rod parallel to the forward conveyor and carried overhung on an arm 49 rotatably mounted at 50 on a base 51 and oscillating under the action of a first jack 52; and a second jack 54, the rod 55 of which is adapted to push back the object 60B located immediately upstream of the object 60A which is to be distributed. The two jacks 52 and 54 are controlled in synchronism by the same distributor 55. This distributor is operated synchronously with the step-by-step advance device of the chain 45 (not shown in detail).

The operation of the whole of this device is as follows:

The object 60 which, in the example shown are flasks of plastic material, are discharged in loose bulk into the supply chamber 10; in view of the conical form of the base 26 which closes this chamber, the flasks 60 are continually urged in the direction of the cylindrical wall 13 of this chamber. As they come into contact with this wall, they are engaged by any one of the transfer rods 25 and are directed by this rod towards the helicoidal transfer ramp 30.

This ramp 30 successively deposits the flasks on the belts 32 and 33 of the first set 11A of the driving assembly 11.

The distance apart of these belts 32 and 33 is obviously chosen as a function of the diameter of the flasks 60, and these latter are deposited on the belts either with the neck towards the front or towards the rear. The flasks 60 are carried by the belts 32 and 33 in the direction of the belts 35 and 36 of the second set 11B of the driving assembly 11. Each flask 60 falls vertically on to this second set of belts, and if its neck is towards the front, this neck comes into contact with the intermediate belt 38 which, as has already been seen, has a retrograde motion. In consequence, this belt 38 causes the flask to tilt in a direction which leads it to lie with its neck to the rear on the belts 35 and 36. It will be understood that if the flask 60 falls on the belts 35 and 36 with its neck towards the rear, it remains in that position.

At the downstream extremity of the belts 35 and 36, the flasks 60 are transferred to the forward conveyor 12. As they pass in front of the photo-electric cell 40, they interrupt the excitation beam of light of this cell and the latter brings the time-lag relay 42 into operation. After the passage of a flask, the photo-electric cell is again excited.

The time delay of the relay 42 is chosen to be at least equal to the time of passage of a flask in front of the cell 40, so that the relay 42 does not trip the switch contact 43 if the flasks pass by normally one by one. On the other hand, if a flask, blocked by the downstream flasks, becomes stationary in front of the cell for a time greater than this time delay, the relay 42 opens the contact 43 which stops the chamber 10 and the set of belts 11A. On the contrary, the forward conveyor 12 continues to operate and ensures the evacuation of the flasks which it carries, as will be described below.

It is thus possible to give the distribution assembly according to the invention a flow rate of receptacles greater than the flow rbate of the receiving line 45, any accidental choking on the forward conveyor 12 being prevented by the on or off operation described above for the supply chamber 10 and at least part of the driving assembly 11.

The flasks 60 carried by the forward conveyor 12 are stopped level with the inclined plane 47 by the transverse abutment 53 and are held above this inclined plane by the longitudinal abutment 48.

Acting in synchronism with the forward-movement mechanism of the transfer chain 45 (not shown in detail), the jack 52 causes the abutment 48 to lift and therefore liberates the corresponding flask 60A, while simultaneously the jack 54, which is operated in synchronism with the jack 52 from the distributor 65, pushes back the flask 60B and all the other flasks 60 on the upstream side. The flask 60A thus freed, on the one hand from the longitudinal abutment 48, and on the other hand from the upstream flasks, is given a kind of flick which causes it to tilt on the inclined plane 40, and from thence it is received by one of the receptacles 46 of the receiving chain 45.

If the flask 60B immediately upstream is presented with the neck towards the front as a result of an error of operation, it would be located slightly behind its theoretical position, by a length equal to that of its neck. In consequence, the rod 55 of the jack 54 cannot reach it and the receptacles upstream of the flask 60A are not pushed back. For this reason, the waiting flask 60A, wedged between the abutment 53 and the upstream flasks which are subjected to the carrying action of the conveyor 12, will not have been freed. In this case, the forward conveyor becomes rapidly choked and the cell 40 stops the installation. This feature thus represents a safety device which ensures that no flask is deposited with its neck forward on the receiving chain.

It will be appreciated that the simplicity of the arrangements according to the invention permit, without useless recycling of the flasks 60, the latter to be deposited one by one and following the desired orientation, on the receiving chain 45 with a large degree of safety of operation.

In accordance with various additional arrangements, there is provided at 70 a fan, the blown air from which acts transversely with respect to the helicoidal ramp 30, slightly above the discharge extremity of this latter, in the direction of the arrow 71, shown in FIG. 1, in order to cause those flasks which are presented vertically at the outlet or discharge extremity of this chamber, to fall back into the supply chamber 11.

In accordance with a further additional arrangement, the discharge extremity of the helicoidal transfer ramp 30 is provided with a notch 72 which opens towards the interior of the supply chamber 10. Because of this notch, and in the case where the supply chamber 10 is utilized for the handling of flasks 60 having a diameter less than the transverse dimension of the helicoidal ramp 30, which could result in the handling of two flasks 60 in parallel, the flask which is nearest to the interior will fall back into the supply chamber 10 when it comes level with the notch 72.

The form of embodiment shown in FIGS. 2 to 5 is more particularly intended for handling objects having a large opening, such as sealing caps or hollow stoppers 100 of flexible material, and comprises a fixed supply chamber 110 into which these stoppers 100 are emptied in loose bulk. The hollow stoppers 100 each have a bottom portion 105 and a large opening 106.

The chamber 110 is formed by a cylindrical wall 111 carried on a frame 112 and inclined to the horizontal, and by a bottom wall 113. This bottom wall is constituted by a plate 114 of ovoid shape, perpendicular to the axis of the cylindrical wall 111. The ovoid plate 114 leaves at its periphery a continuous slot 115 between itself and a complementary ovoid opening 116 formed in a front panel 117 of the frame 112, and is carried by two cylindrical bases 118 and 119, fixed to the frame 112, respectively arranged at the centre of its zone having the largest radius of curvature and at the centre of its zone having the smallest radius of curvature. As has been more clearly shown in FIG. 3, it is this latter which forms the upper portion of the ovoid plate 114, while the lower portion of this plate is formed by the zone having the largest radius of curvature.

Around the cylindrical base 118 is rotatably mounted a sleeve 120 to which is fixed a pinion 121 having the same radius as the large curvature zone of the plate 114.

On the sleeve 120 there is also keyed a pinion 122 driven by a motor 123 through the intermediary of a chain 124, a pinion 125 and a reduction gear 126.

Around the cylindrical base 119, there is rotatably mounted a pinion 127 corresponding to the pinion 121, the pinion 127 having the same radius as the zone of smallest radius of the ovoid plate 114.

Over the pinions 121 and 127, a chain 130 is passed in a loop, the chain being thus parallel to the slot 115.

As will be more clearly seen by reference to FIG. 4, the chain 130 is provided at regular intervals with supports 131 engaged in the slot 115. Beyond this latter, each of these supports carries in the overhung position a finger 132 elongated in the direction of the slot 115 parallel to the base wall 113.

The whole of the fingers 132 forms the movable transfer means associated with the supply chamber 110. These fingers 132 have transverse dimensions less than the diameter of the stoppers 100 so as to engage in the openings 106 of these latter, and are shaped in such manner as to prevent any accidental wedging.

At its upper portion, the slot 115 is flanked by two edges, one internal 136, the other external 137, which conjointly form a pasasge 138 which crosses the slot 115 and is connected to an inclined evacuation spout 139. The inner border 136 is pierced with an opening 140 arranged astride the slot 115 so as to permit the passage of the fingers 132.

On the evacuation spout 139 is interposed a time-delayed photoelectric detector 141, which is mounted vertically in the example shown. The electric supply to the motor 123 is controlled in dependence on the detector 141 through the intermediary of an amplifier 142 and a supply contactor 143.

Parallel to and above the spout 139 is provided a belt 145 passed in a loop over two pulleys 146 and 147, of which one, the pulley 147, is driven in rotation by a motor 148.

At the downstream extremity of the spout 139, between this downstream extremity and a receiving chain (not shown), is arranged a device for extracting the objects 150 one by one.

In accordance with the form of embodiment chosen and shown in the drawings, the device 150 comprises a barrel 151 mounted between two side plates 152, 152A, and mounted for rotation step-by-step under the control of a ratchet wheel (not shown) which is actuated by a lever 153 articulated on the piston 154 of a double-acting jack 155 which is actuated in turn by the receiving chain for the stoppers (not shown) and therefore working in perfect synchronism with it. The barrel 151 is bored to form a plurality of radial housings 160, each adapted to receive a stopper 100.

In one of its extreme positions, the lever 153 actuates a micro-switch 156; in the other of its end positions, it actuates a micro-switch 157. The function of these micro-switches will become apparent later.

Laterally, the side plate 152 carries a double-acting jack 158 known as the locking jack, the piston of which (not shown on the drawings) passes through an appropriate opening in the side plate 152 so as to cooperate with blind holes 159 uniformly distributed peripherally over the corresponding lateral face of the barrel 151.

At the downstream extremity of the evacuation spout 139 which forms a slightly inclined plane with respect to the remainder of the spout (FIG. 5), a quadrant plate 170 carries a double-acting jack 161, known as the blocking jack, of which the piston 162 is movable transversely with respect to the said spout.

The movement of the piston 162 of the blocking jack 160 is controlled in one direction by the microswitch 156 and in the other direction by the microswitch 157. This is also true for the movements of the piston of the locking jack 158.

Vertically below the barrel 151 is mounted a conical receiving hopper 165, which delivers on to the receiving chain (not shown). This hopper 165 is provided laterally with two nozzles 166, 167, blowing compressed air.

In addition, a similar nozzle 168 is provided on the passage 138 located at the upper portion of the chamber 110, slightly upstream of the notch 140 of the passage 138, that is to say in the downward portion of this passage.

The stoppers 100 are emptied in loose bulk into the supply chamber 110 and the motor 123 is started up. The transfer fingers 132 plunge successively and in sequence into the mass of stoppers 100 and in most cases they each take one of these stoppers by engaging in the opening of the stopper.

It should be noted that the transfer means 132 are the only moving elements with which the stoppers are in contact and in consequence the latter are only subjected to very limited movements and therefore to friction which produces wear.

It should also be observed that the ovoid form of the plate 114 facilitates the correct disengagement of the fingers 132 from the mass of stoppers 100. Any stopper which is not correctly engaged on a finger 132, but is carried away by jamming or by contact, can only fall back into the mass of the other stoppers when it passes over the straight section of the slot 115 between the zone with a large radius of curvature and the zone with a small radius of curvature of the said slot. The mass of stoppers 100 is obviously collected together in the lower portion of the chamber 110.

In addition, this ovoid shape enables a large number of fingers 132 to be employed for a given pitch.

When any of the fingers 132, carrying a stopper 100, comes level with the nozzle 168 in the passage 138, the jet of air blown through this nozzle 168 helps to complete the liberation of the stopper 100 carried by the said finger, this liberation having already being commenced under the action of gravity alone.

The stopper 100, thus freed, is engaged in the evacuation spout 139 and slides simply by gravity inside this spout.

During this sliding movement, the stoppers 100 come in contact with the lower side of the driving belt 145, which has the effect of keeping them or putting them back on the axis of the spout 139 and therefore of preventing them from becoming jammed between the lateral walls of the spout, which could cause an obstruction in this latter.

At the bottom of the spout 129, the barrel 151 of the device 150 is given a step-by-step movement of rotation under the action of the double-acting jack 155. In each of its positions, the barrel 151 has one of its housings 160 immediately below the extremity of the spout 139, FIG. 4, and is locked in this position by the piston rod of the locking jack 158.

At each forward movement of the barrel 151 by one step, a stopper 100 is engaged in the housing 160 which is located directly beneath the spout 139, while the piston rod 162 of the blocking jack 161 stops the movement of the column of stoppers 100 in the spout 139 (see FIG. 5). The terminal inclined plane of this spout facilitates the holding of the imobilized stopper outside the volume swept by the barrel 151, and also enables the stopper to be disengaged from that which follows it, in the case where the shape of the stoppers is such that one can fit inside the other.

The blocking jack 161 and the locking jack 158 are operated in synchronism with the step-by-step forward movement of the barrel 151 by the micro-switches 156 and 157, operated alternately at the end positions of the lever 153 which, in co-operation with a ratchet wheel (not shown) controls the forward rotation of the barrel 151.

When they arrive directly above the hopper 165, the stoppers 100 fall into the hopper by the simple action of gravity and their fall is accelerated by the jets of air blown through the nozzles 166 and 167.

The receiving line (not shown on the drawings) which is located immediately below the hopper 165 and which controls the jack 155, as has already been seen, is thus supplied with stoppers 100, the said stoppers being deposited one by one with a definite longitudinal orientation, namely with the opening 106 to the front in the example shown.

As described above, if in consequence of a momentary choking-up of the evacuation spout 139, one of the stoppers 100 stops in front of the photoelectric detector 141, the latter cuts-off the supply to the motor 123 and in consequence the chain 130 stops rotating and the fingers 132 no longer discharge stoppers 100 into the spout 139. At the same time, the extraction device 150 at the base of this spout continues to operate; the choking of the spout 139 is thereby gradually cleared.

When there is no longer a stopper 100 stationary in front of the detector 141, the latter again operates the starting-up of the motor 123. The detector 141 is of course provided with a time delay so as not to be affected by the simple passage by gravity of a stopper 100 into the spout 139.

An alternative form of embodiment, more particularly intended for the treatment of tubes 200, will now be described with reference to FIGS. 6 to 8.

According to this form of embodiment, the supply chamber 210 is formed by a cylindrical wall 211 carried on a frame 212 and inclined to the horizontal, and by a bottom wall 213, constituted by a flat disc perpendicular to the axis of the cylindrical wall 211 and keyed for rotation on a shaft 214. This shaft is driven in rotation by a motor 215, through the intermediary of a reduction gear 216A.

In its peripheral zone, the bottom disc 213 is provided with a plurality of transfer fingers 216. These transfer fingers are elongated parallel to the plane of the bottom disc 213 and are uniformly distributed around the periphery of this disc.

As can be seen more clearly from FIG. 8, each of the fingers 216 is pierced with an internal channel 217 which is extended by a bore 218 formed transversely in the bottom disc 213.

At its lower portion, the cylindrical wall 211 is provided with an evacuation opening 220. A fixed edge 221 is provided parallel to the cylindrical wall 211 over half the periphery of this latter, so that the transfer fingers 216 carried by the bottom disc 213 circulate, for the said half of this periphery, in a passage formed between the cylindrical wall 211 and the fixed edge 221. This edge extends especially facing the evacuation opening 220 which it isolates from the remainder of the supply chamber 210.

Slightly upstream of the upstream extremity 225 of the edge 221, a nozzle 226 carried by the cylindrical wall 11 blows air parallel to the bottom disc 213.

As can be more clearly seen from FIG. 8, under the disc 213, a nozzle 227 arranged at the level of the path followed by the bore 218 formed in the disc 213, is subjected to the action of a spring 228 so as to be applied against the disc 213 in the same way as a collector shoe. This nozzle 227 is slidably mounted in a casing 229 fixed to the frame 212 of the device, and is connected at 230 to a source of compressed air.

In correspondence with the evacuation opening 220 formed in the cylindrical wall 211 of the supply chamber 210 is arranged an inclined evacuation spout 231. On this spout there is interposed, as in the previous case, a photoelectric detector 232 with a time delay, by which the electrical supply of the motor 215 is controlled.

The installation is completed by a one-by-one extraction device (not shown), arranged between the evacuation spout 231 and a receiving chain (not shown).

The operation is similar to that previously described for the construction illustrated in FIGS. 2 to 5.

The tubes 200 are emptied in loose bulk into the supply chamber 210. The transfer fingers 216 plunge successively and in sequence into the mass of tubes 200 and in the majority of cases, each of the fingers extracts a tube from the mass.

In the event of several tubes being carried away by the same finger 216, for example by jamming of these tubes between a finger 216 and the fixed cylindrical wall 211, the excess tubes are eliminated on the upstream side of the edge 221 by the jet of air blown through the nozzle 226.

When any one of the contact fingers reaches the level of the nozzle 227, upstream of the evacuation opening 220, the jet of air blown through this nozzle 227 assists in the completion of the freeing of the tube 200 carried by this finger.

The tube 200 thus liberated is engaged in the evacuation spout 231 and slides down it by the sole action of gravity.

The supply of this spout is kept regular by the detector 232 as in the previous case.

At the bottom of this spout, the associated extraction device, which may be of the same type as that previously described, or which may be different, deposits the tubes one by one on the receiving chain.

The present invention is of course not limited to the forms of embodiment described and shown, especially as regards the one-by-one transfer device at the bottom of the evacuation means, which device may form the subject of numerous forms of construction.

Furthermore, in the case of the form of embodiment of FIGS. 6 to 8, the liberation by gravity only of the tubes 200 engaged on the transfer fingers 216 is in most cases sufficient to avoid the necessity of providing an internal blowing channel 217 in the said transfer fingers.

What I claim is:

1. In an automatic device for the distribution and orientation of various objects such as flasks, bottles, tubes, stopper caps or the like, for the automatic supply of such objects, following a predetermined longitudinal orientation, to a receiving line such as a printing line, a filling line, a stopper-insertion line or the like, said device comprising, successively: a supply chamber formed by a bottom wall and a cylindrical wall and adapted to receive such objects in loose bulk, said cylindrical wall being driven in rotation about its axis; driving rods projecting from the internal surface of said cylindrical wall, said driving rods constituting transfer members for taking such objects from said chamber and being inclined to the direction of the generatrix lines of said cylindrical wall and extending at least up to the discharge extremity of said cylindrical wall; said bottom wall of said chamber being constituted by a stationary conical wall coaxial with said cylindrical wall and disposed radially inside of said cylindrical wall, the periphery of said conical wall being in proximity to said cylindrical wall and the apex of said conical wall being directed toward the discharge extremity of said cylindrical wall; a stationary helicoidal transfer ramp disposed in the vicinity of said driving rods and oriented substantially at right angles to said rods, said ramp extending between a transfer extremity in contact with said conical wall and a discharge extremity projecting from said chamber at the discharge extremity of said cylindrical wall; and evacuation means disposed below the discharge extremity of said transfer ramp for receiving such objects from said transfer members and transfer ramp and for discharging them onto such receiving line.

2. A device as claimed in claim 1, and further comprising the provision on said evacuation means of a photoelectric cell, the control beam of which is interrupted by each of the objects during their passage when carried by said evacuation means, said cell effecting the stoppage of said transfer members when it is not excited, through the intermediary of a time-lag relay, the time delay of which is at least equal to the time of passage of an object in front of said cell, whereby a regular uniform supply to such receiving line is effected without blockages and without recycling of the excess objects.

3. A device as claimed in claim 1, in which said evacuation means deliver into a device which ensures the delivery one by one of such objects onto the receiving chain.

4. A device as claimed in claim 3, in which said evacuation means are constituted by an evacuation spout and said one-by-one delivery device comprises a barrel driven in step-by-step rotation by the receiving line above a conical receiving hopper disposed vertically above said receiving line, said barrel being provided radially with a plurality of housings, each intended to receive an object, in combination with a jack operated in synchronism with said barrel, said jack having a piston movable transversely with respect to said evacuation spout in order to block the object located at the base of said spout during the rotation of the barrel by one step.

5. A device as claimed in claim 1, in which said helicoidal transfer ramp has a width transversely to the direction of the generatrix lines of said cylindrical wall greater than the largest transverse dimension of the objects handled, and preferably comprised between once and twice said dimension, and provided in proximity to its discharge extremity with a section of reduced width, said reduced width being preferably in the vicinity of or slightly less than said transverse dimension.

6. An automatic device for the distribution and orientation of various objects such as flasks, bottles, tubes, stopper caps or the like, for the automatic supply of such objects, with a predetermined longitudinal orientation, to a receiving line such as a printing line, a filling line, a stopper-insertion line or the like, said device comprising, successively: a supply chamber formed by a bottom wall and a cylindrical wall and adapted to receive such objects in loose bulk, said two walls being stationary and independent of each other and one of said walls being provided with a continuous slot; transfer members for taking such objects from said chamber, said transfer members being carried by supports which pass through said slot and which, beyond said slot, are coupled to a driving chain parallel to said slot and are passed in a loop over at least two pinions one of which is driven in rotation by a motor; and evacuation means for receiving such objects from said transfer members and for discharging them onto such receiving line.

7. A device as claimed in claim 6, in which the bottom wall of said supply chamber is an inclined fixed plate of ovoid shape, of which the portion having the smaller radius of curvature forms the upper zone, said plate being bordered laterally by the said slot through which pass the supports of said transfer members.

8. A device as claimed in claim 7, in which, in the case of objects having a large opening, such as tubes, sealing caps and the like, said transfer members are constituted by fingers parallel to the bottom wall, said fingers having transverse dimensions less than the diameter of the opening of said objects, for the purpose of engagement in said opening.

9. A device as claimed in claim 8, in which, over at least the part of their travel, said transfer fingers circulate in a passage communicating with an evacuation spout.

10. A device as claimed in claim 8, in which air-blowing nozzles are provided in order to eliminate the objects which are not correctly engaged on said transfer fingers, and in order to accelerate the disengagement of said objects from said fingers.

11. An automatic device for the distribution and orientation of various objects such as flasks, bottles, tubes, stopper caps or the like, for the automatic supply of such objects, with a predetermined longitudinal orientation, to a receiving line such as a printing line, a filling line, a stopper-insertion line or the like, said device comprising, successively: a supply chamber formed by a bottom wall and a cylindrical wall for receiving such objects in loose bulk, the walls of said chamber being independent of each other and at least one of said walls being fixed; transfer members for taking such objects from said chamber; evacuation means for receiving such objects from said transfer members and for discharging them onto such receiving line; and a delivery device to which objects are delivered by said evacuation means and which insures the delivery, one-by-one, of such objects onto the receiving line, said delivery device including: an inclined plane flush laterally with the level of said evacuation means; a movable holding member displaceable between a first position in which it stops and holds an object facing said inclined plane and a second position in which it frees such objects; a first jack arranged for operating said holding member; and a second jack having a rod which is movable between a retracted position and an extended position in which it separates such objects from the next object immediately upstream therefrom.

References Cited

UNITED STATES PATENTS 2,571,576  10/1951  Hopkins _____ 221—10
2,819,816  1/1958   Moeltzner _____ 221—298
3,348,654  10/1967  Garrett _____ 198—33

RICHARD E. AEGERTER, *Primary Examiner.*